US 6,517,905 B2

(12) United States Patent
White et al.

(10) Patent No.: US 6,517,905 B2
(45) Date of Patent: Feb. 11, 2003

(54) THERMOSETTING COMPOSITIONS CONTAINING HYDROXYL-FUNCTIONAL POLYMERS PREPARED USING ATOM TRANSFER RADICAL POLYMERIZATION

(75) Inventors: Daniela White, Pittsburgh, PA (US); James B. O'Dwyer, Valencia, PA (US); Dennis A. Simpson, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/964,964

(22) Filed: Sep. 27, 2001

(65) Prior Publication Data

US 2002/0040097 A1 Apr. 4, 2002

Related U.S. Application Data

(62) Division of application No. 09/375,019, filed on Aug. 16, 1999, now Pat. No. 6,319,987.
(60) Provisional application No. 60/098,619, filed on Aug. 31, 1998.

(51) Int. Cl.$^7$ .......................... C08F 4/40; C08F 293/00; C08G 18/62
(52) U.S. Cl. ................. 427/385.5; 427/388.2; 428/411.1; 428/500; 525/92 C; 525/92 K; 525/123; 525/124; 525/162; 528/45; 528/85
(58) Field of Search ............ 427/385.5, 388.2; 428/411.1, 500; 525/92 C, 92 K, 123, 124, 162; 528/45, 85

(56) References Cited

U.S. PATENT DOCUMENTS

| | | | |
|---|---|---|---|
| 4,147,679 A | 4/1979 | Scriven et al. | 260/29.2 TN |
| 4,403,003 A | 9/1983 | Backhouse | 427/407.1 |
| 4,851,477 A | 7/1989 | Hutchins et al. | 525/123 |
| 5,003,004 A | 3/1991 | Simms | 525/68 |
| 5,071,904 A | 12/1991 | Martin et al. | 524/458 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,945,487 A | 8/1999 | Ohkoshi et al. | 525/327.3 |
| 6,121,380 A | 9/2000 | McGinniss et al. | 525/123 |

FOREIGN PATENT DOCUMENTS

| | | | |
|---|---|---|---|
| EP | 0 258 065 A2 | 3/1988 | C08G/85/00 |
| EP | 0 773 267 A1 | 5/1997 | C09D/5/03 |
| WO | WO 98/40415 | 9/1998 | C08F/4/10 |

OTHER PUBLICATIONS

ASTM—Designation: D 1474–98; pp. 1–5; Standard Test Methods for Indentation Hardness of Organic Coatings.
ASTM—Designation: E 222–94; pp. 1–7; Standard Test Methods for Hydroxyl Groups Using Acetic Anhydride Acetylation.

Primary Examiner—D. R. Wilson
(74) Attorney, Agent, or Firm—William J. Uhl

(57) ABSTRACT

A thermosetting composition that includes:
(a) a crosslinking agent having at least two functional groups reactive with hydroxyl groups; and
(b) a non-gelled, hydroxyl functional polymer prepared by atom transfer radical polymerization. The polymer contains at least one of the following polymer chain structures:

$$-\{(M)_p-(G)_q\}_x-$$

or $$-\{(G)_q-(M)_p\}_x-$$

wherein M is a residue, that is free of hydroxyl functionality, of at least one monomer; G is a residue, that has hydroxyl functionality, of at least one monomer; p and q represent average numbers of residues occurring in a block of residues in each polymer chain structure; and p, q, and x are each independently selected for each structure such that the hydroxyl functional polymer has a number average molecular weight of at least 250. Also provided are methods of coating a substrate using compositions of the present invention and substrates coated by such methods, as well as color-plus-clear composite coatings.

42 Claims, No Drawings

THERMOSETTING COMPOSITIONS CONTAINING HYDROXYL-FUNCTIONAL POLYMERS PREPARED USING ATOM TRANSFER RADICAL POLYMERIZATION

CROSS-REFERENCE TO RELATED APPLICATION

This application is a Division of U.S. patent application Ser. No. 09/375,019, filed Aug. 16, 1999, now U.S. Pat. No. 6,319,987 B1, which claims the benefit of U.S. Provisional Application Serial. No. 60/098,619, filed Aug. 31, 1998, which is hereby incorporated by reference.

FIELD OF THE INVENTION

The present invention relates to thermosetting (curable) compositions of one or more crosslinking agents and one or more hydroxyl functional polymers. The hydroxyl functional polymer is prepared by atom transfer radical polymerization, and has well defined polymer chain structure, molecular weight and molecular weight distribution. The present invention also relates to methods of coating a substrate, substrates coated by such methods, and color-plus-clear composite coating compositions.

BACKGROUND OF THE INVENTION

Reducing the environmental impact of curable compositions, such as that associated with emissions into the air of volatile organic compounds during the application of curable coating compositions, has been an area of ongoing investigation and development in recent years. Accordingly, interest in high solids liquid coating compositions has been increasing, due in part to their comparatively lower volatile organic content (VOC), which significantly reduces air emissions during the application process.

Lower VOC coating compositions are particularly desirable in the automotive original equipment manufacture (OEM) market, due to the relatively large volume of coatings that are used. However, in addition to the requirement of lower VOC levels, automotive manufacturers have very strict performance requirements for the coatings that are used. For example, automotive OEM top coats are typically required to have a combination of good exterior durability and excellent gloss and appearance.

Thermosetting coatings containing hydroxyl functional polymers have been used extensively as automotive OEM primers and top coats. Such coating compositions typically comprise a crosslinking agent having at least two functional groups that are reactive with hydroxyl groups, and a hydroxyl functional polymer. The hydroxyl functional polymers used in such coating compositions are typically prepared by standard, i.e., non-living, radical polymerization methods, which provide little control over molecular weight, molecular weight distribution and polymer chain structure.

The physical properties, e.g., viscosity, of a given polymer can be directly related to its molecular weight. Higher molecular weights are typically associated with, for example, higher Tg values and viscosities. The physical properties of a polymer having a broad molecular weight distribution, e.g., having a polydispersity index (PDI) in excess of 2.5, can be characterized as an average of the individual physical properties of and indeterminate interactions between the various polymeric species that comprise it. As such, the physical properties of polymers having broad molecular weight distributions can be variable and hard to control.

The polymer chain structure, or architecture, of a polymer can be described as the sequence of monomer residues along the polymer back bone or chain. A hydroxyl functional copolymer prepared by standard radical polymerization techniques will contain a mixture of polymer molecules having varying individual hydroxyl equivalent weights and polymer chain structures. In such a copolymer, the hydroxyl functional groups are located randomly along the polymer chain. Moreover, the number of functional groups is not divided equally among the polymer molecules, such that some polymer molecules may actually be free of hydroxyl functionality. In a thermosetting composition, the formation of a three-dimensional crosslinked network is dependent on the functional equivalent weight as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed polymerizate, e.g., a cured or thermoset coating.

The continued development of new and improved thermosetting compositions having lower VOC levels and a combination of favorable performance properties is desirable. In particular, it would be desirable to develop thermosetting compositions that comprise hydroxyl functional copolymers having well-defined molecular weights and polymer chain structure, and narrow molecular weight distributions, e.g., PDI values less than 2.5.

International patent publication WO 97/18247 and U.S. Pat. Nos. 5,763,548 and 5,789,487 describe a radical polymerization process referred to as atom transfer radical polymerization (ATRP). The ATRP process is described as a living radical polymerization that results in the formation of polymers having predictable molecular weight and molecular weight distribution. The ATRP process of these publications is also described as providing highly uniform products having controlled structure (i.e., controllable topology, composition, etc.). These patent publications also describe polymers prepared by ATRP, which are useful in a wide variety of applications, for example, with paints and coatings.

It would be desirable to develop thermosetting compositions that comprise hydroxyl functional copolymers prepared using atom transfer radical polymerization, thus having well-defined molecular weights and polymer chain structure, and narrow molecular weight distributions. Such compositions would have lower VOC levels due to lower viscosities, and a combination of favorable performance properties, particularly in coatings applications.

SUMMARY OF THE INVENTION

In accordance with the present invention, a thermosetting composition is provided comprising:
(a) a crosslinking agent having at least two functional groups that are reactive with hydroxyl groups; and
(b) a non-gelled, hydroxyl functional polymer prepared by atom transfer radical polymerization, in the presence of an initiator having at least one radically transferable group, and wherein the polymer contains at least one of the following polymer chain structures:

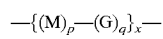

or

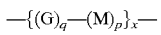

wherein M is a residue, that is free of hydroxyl functionality, of at least one ethylenically unsaturated radically polymerizable monomer; G is a residue, that has hydroxyl functionality, of at least one ethylenically unsaturated radically polymerizable monomer; p and q represent average numbers of residues occurring in a block of residues in each polymer chain structure; and p, q, and x are each independently selected for each structure such that the hydroxyl functional polymer has a number average molecular weight of at least 250.

Also provided by the present invention are methods of coating a substrate using compositions of the present invention, substrates coated by such methods, and color-plus-clear composite coating compositions.

Other than in the operating examples, or where otherwise indicated, all numbers expressing quantities of ingredients, reaction conditions, and so forth used in the specification and claims are to be understood as modified in all instances by the term "about".

DETAILED DESCRIPTION

As used herein, the term "polymer" is meant to refer to both homopolymers, i.e., polymers made from a single monomer species, and copolymers, i.e., polymers made from two or more monomer species, as well as oligomers.

The hydroxyl functional polymer used in the composition of the present invention is a non-gelled polymer prepared by atom transfer radical polymerization, in the presence of an initiator having at least one radically transferable group. The polymer contains at least one of the following polymer chain structures:

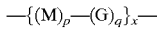 (I)

or

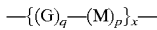 (II)

where M is a residue, that is free of hydroxyl functionality, of at least one ethylenically unsaturated radically polymerizable monomer; G is a residue, that has hydroxyl functionality, of at least one ethylenically unsaturated radically polymerizable monomer; p and q represent average numbers of residues occurring in a block of residues in each polymer chain structure; and p, q, and x are each independently selected for each structure such that the hydroxyl functional polymer has a number average molecular weight ($M_n$) of at least 250, preferably at least 1000, and more preferably at least 2000. The hydroxyl functional polymer also typically has a $M_n$ of less than 16,000, preferably less than 10,000, and more preferably less than 5000. The $M_n$ of the hydroxyl functional polymer may range between any combination of these values, inclusive of the recited values. Unless otherwise indicated, all molecular weights described in the specification and claims are determined by gel permeation chromatography using a polystyrene standard. Note that structures I and II define "x segments" within the polymer.

The subscripts p and q as shown in structures I and II represent average numbers of residues occurring in a block of residues in each polymer chain structure. Typically, p and q each independently have a value of 0 or more, preferably at least 1, and more preferably at least 5 for each of general polymer structures I and II. Also, subscripts and q each independently have a value of typically less than 100, preferably less than 20, and more preferably less than 15 for each of general polymer structures I and II. The values of subscripts p and q may range between any combination of these values, inclusive of the recited values. Moreover, the sum of p and q is greater than zero within an x segment and q is greater than zero within at least one x segment in the polymer.

Typically, the subscript x as shown in structures I and II has a value of at least 1. Also, subscript x typically has a value of less than 100, preferably less than 50, and more preferably less than 10. The value of subscript x may range between any combination of these values, inclusive of the recited values. Moreover, when more than one of the structures I and/or II occur in a polymer molecule, x may have different values for each structure (as may p and q) allowing for a variety of polymer architectures, such as gradient copolymers.

The —(M)$_p$— portion of general structures I and II represents (1) a homoblock of a single type of M residue (that is p units long), (2) an alternating block of two types of M residues, (3) a polyblock of two or more types of M residues, or (4) a gradient block of two or more types of M residues. For purposes of illustration, when the M-block is prepared from, for example, 10 moles of methyl methacrylate, the —(M)$_p$— portion of structures I and II represents a homoblock of 10 residues of methyl methacrylate. In the case where the M-block is prepared from, for example, 5 moles of methyl methacrylate and 5 moles of butyl methacrylate, the —(M)$_p$— portion of general structures I and II typically represents, depending on the conditions of preparation, as is known to one of ordinary skill in the art: (a) a diblock of 5 residues of methyl methacrylate and 5 residues of butyl methacrylate having a total of 10 residues (i.e., p=10); (b) a diblock of 5 residues of butyl methacrylate and 5 residues of methyl methacrylate having a total of 10 residues; (c) an alternating block of methyl methacrylate and butyl methacrylate residues beginning with either a residue of methyl methacrylate or a residue of butyl methacrylate, and having a total of 10 residues; or (d) a gradient block of methyl methacrylate and butyl methacrylate residues beginning with either residues of methyl methacrylate or residues of butyl methacrylate having a total of 10 residues.

The —(G)$_q$— portions of polymer chain structures I and II may be described in a manner similar to that of the —(M)$_p$— portions.

The following are presented for the purpose of illustrating the various polymer architectures that are represented by general polymer chain structures I and II.

Homoblock Polymer Architecture

When x is 1, p is 0 and q is 5, general polymer chain structure I represents a homoblock of 5 G residues, as more specifically depicted by the following general formula III.

 (III)

Diblock Copolymer Architecture

When x is 1, p is 5 and q is 5, general polymer chain structure I represents a diblock of 5 M residues and 5 G residues as more specifically depicted by the following general formula IV.

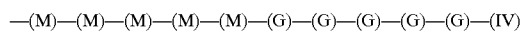 (IV)

Alternating Copolymer Architecture

When x is greater than 1, for example, 5, and p and q are each 1 for each x-segment, polymer chain structure I represents an alternating block of M and G residues, as more specifically depicted by the following general formula V.

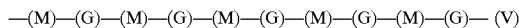

Gradient Copolymer Architecture

When x is greater than 1, for example, 4, and p and q are each independently within the range of, for example, 1 to 3, for each x-segment, polymer chain structure I represents a gradient block of M and G residues, as more specifically depicted by the following general formula VI.

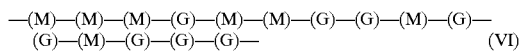

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail on pages 72 through 78 of international patent publication WO 97/18247.

Residue M of general polymer chain structures I and II is derived from at least one ethylenically unsaturated radically polymerizable monomer. As used herein and in the claims, "ethylenically unsaturated radically polymerizable monomer" and like terms are meant to include vinyl monomers, (meth)allylic monomers, olefins and other ethylenically unsaturated monomers that are radically polymerizable.

Classes of vinyl monomers from which M may be derived include, but are not limited to, (meth)acrylates, vinyl aromatic monomers, vinyl halides and vinyl esters of carboxylic acids. As used herein and in the claims, by "(meth)acrylate" and like terms is meant both methacrylates and acrylates. Preferably, residue M is derived from at least one of alkyl (meth)acrylates having from 1 to 20 carbon atoms in the alkyl group, vinyl aromatic monomers, vinyl halides, vinyl esters of carboxylic acids and olefins. Specific examples of alkyl (meth)acrylates having from 1 to 20 carbon atoms in the alkyl group from which residue M may be derived include, but are not limited to, methyl (meth) acrylate, ethyl (meth)acrylate, propyl (meth)acrylate, isopropyl (meth)acrylate, butyl (meth)acrylate, tert-butyl (meth)acrylate, 2-ethylhexyl (meth)acrylate, lauryl (meth) acrylate, isobornyl (meth)acrylate, cyclohexyl (meth) acrylate, 3,3,5-trimethyl cyclohexyl (meth)acrylate, and isobutyl (meth)acrylate.

Residue M may also be selected from monomers having more than one (meth)acrylate group, for example, (meth) acrylic anhydride and diethyleneglycol bis((meth)acrylate). Residue M may also be selected from alkyl (meth)acrylates containing radically transferable groups, which can act as branching monomers, for example, 2-(2-bromopropionoxy) ethyl acrylate.

Specific examples of vinyl aromatic monomers from which M may be derived include, but are not limited to, styrene, p-chloromethylstyrene, divinyl benzene, vinyl naphthalene and divinyl naphthalene. Vinyl halides from which M may be derived include, but are not limited to, vinyl chloride and vinylidene fluoride. Vinyl esters of carboxylic acids from which M may be derived include, but are not limited to, vinyl acetate, vinyl butyrate, vinyl benzoate, vinyl esters of VERSATIC Acid (VERSATIC Acid is a mixture of tertiary aliphatic carboxylic acids available from Shell Chemical Company), and the like.

As used herein and in the claims, by "olefin" and like terms is meant unsaturated aliphatic hydrocarbons having one or more double bonds, obtained by cracking petroleum fractions. Specific examples of olefins from which M may be derived include, but are not limited to, propylene, 1-butene, 1,3-butadiene, isobutylene and di-isobutylene.

As used herein and in the claims, by "(me h)allylic monomer(s)" is meant monomers containing substituted and/or unsubstituted allylic functionality, i.e., one or more radicals represented by the following general formula VII,

wherein R is hydrogen, halogen or a $C_1$ to $C_4$ alkyl group. Most commonly, R is hydrogen or a methyl group. Examples of (meth)allylic monomers include, but are not limited to: (meth)allyl alcohol; (meth)allyl ethers, such as methyl (meth)allyl ether; (meth)allyl esters of carboxylic acids, such as (meth)allyl acetate; (meth)allyl benzoate; (meth)allyl n-butyrate; (meth)allyl esters of VERSATIC Acid; and the like.

Other ethylenically unsaturated radically polymerizable monomers from which M may be derived include, but are not limited to: cyclic anhydrides, e.g., maleic anhydride, 1-cyclopentene-1,2-dicarboxylic anhydride and itaconic anhydride; esters of acids that are unsaturated but do not have (x,p-ethylenic unsaturation, e.g., methyl ester of undecylenic acid; and diesters of ethylenically unsaturated dibasic acids, e.g., diethyl maleate.

The monomer block designated as $(G)_q$ in the structures above may be derived from one type of monomer or a mixture of two or more monomers. As discussed above, such mixtures may be blocks of monomer residues or they may be alternating residues.

Residue G of general polymer chain structures I and II may be derived from monomers having hydroxyl functionality. Typically residue G is derived from at least one of hydroxyalkyl acrylates and hydroxyalkyl methacrylates which have from 2 to 4 carbon atoms in the hydroxyalkyl group, including, for example, hydroxyethyl (meth)acrylate, hydroxypropyl (meth)acrylate, hydroxybutyl (meth) acrylate, and the like. Residue G may alternatively be derived from allyl alcohols and vinyl alcohols. Alternatively, hydroxyl functionality may be incorporated into the polymer by post-reaction, such as by first preparing an epoxy or acid functional polymer and reacting it with an acid functional (if the polymer is epoxy functional) or epoxy functional (if the polymer is acid functional) compound to form a polymer having secondary hydroxyl functionality.

Preferably, the polymer contains at least one of the following polymer chain structures:

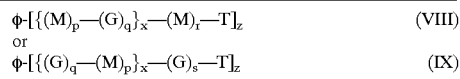

where the subscripts r and s represent average numbers of residues occurring in the respective blocks of M and G residues. The —$(M)_r$— and —$(G)_s$— portions of general structures VIII and IX have meanings similar to those as previously described herein with regard to portions —$(M)_p$— and —$(G)_q$—. The moiety $\phi$ is or is derived from a residue of the initiator free of the radically transferable group; p, q, and x are as defined above; z is at least 1; T is or is derived from the radically transferable group of the initiator; and the epoxy functional polymer has a polydispersity index of less than 2.5, preferably less than 2.0, more preferably less than 1.8, and even more preferably less than 1.5.

It should be understood that the structures VIII and IX can represent the polymer itself or, alternatively, each of the structures can comprise a terminal segment of the polymer. For example, when the polymer is by prepared by ATRP using an initiator having one radically transferable group and z is 1, either of the structures VIII and IX can represent an entire linear polymer. However, when the hydroxyl functional polymer is a star or other branched polymer, wherein some of the branches may not have hydroxyl functionality, general polymer chain structures VIII and IX represent a portion of the hydroxyl functional polymer.

For each of general polymer structures VIII and IX, the subscripts r and s each independently have a value of 0 or more. Subscripts r and s each independently have a value of typically less than 100, preferably less than 50, and more preferably less than 10, for each of general polymer structures VIII and IX. The values of r and s may each range between any combination of these values, inclusive of the recited values.

The hydroxyl functional polymer typically has a hydroxyl equivalent weight of at least 116 grams/equivalent, preferably at least 200 grams/equivalent. The hydroxyl equivalent weight of the polymer is also preferably less than 10,000 grams/equivalent, preferably less than 5000 grams/equivalent, and more preferably less than 1000 grams/equivalent. The hydroxyl equivalent weight of the hydroxyl functional polymer may range between any combination of these values, inclusive of the recited values. As used herein, hydroxyl functional equivalent weights are determined in accordance with ASTM E 222–94.

As mentioned above, the hydroxyl functional polymer used in the thermosetting compositions of the present invention is prepared by atom transfer radical polymerization. The ATRP method is described as a "living polymerization," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., PDI values less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having at least one radically transferable atom or group; a transition metal compound, i.e., a catalyst, which participates in a reversible redox cycle with the initiator; and a ligand, which coordinates with the transition metal compound. The ATRP process is described in further detail in international patent publication WO 97/18247 and U.S. Pat. Nos. 5,763,548 and 5,789,487.

In preparing hydroxyl functional polymers of the present invention, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds, and mixtures thereof, each having at least one radically transferable group, which is typically a halo group. The initiator may also be substituted with functional groups, e.g., hydroxyl groups. Additional useful initiators and the various radically transferable groups that may be associated with them are described on pages 42 through 45 of international patent publication WO 97/18247.

Polymeric compounds (including oligomeric compounds) having radically transferable groups may be used as initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found in U.S. Pat. No. 5,789,487.

Preferably, the initiator may be selected from the group consisting of halomethane, methylenedihalide, haloform, carbon tetrahalide, methanesulfonyl halide, p-toluenesulfonyl halide, methanesulfenyl halide, p-toluenesulfenyl halide, 1-phenylethyl halide, 2-halopropionitrile, $C_1$–$C_6$-alkyl ester of 2-halo-$C_1$–$C_6$-carboxylic acid, p-halomethylstyrene, mono-hexakis(($\alpha$-halo-$C_1$–$C_6$-alkyl)benzene, diethyl-2-halo-2-methyl malonate, benzyl halide, ethyl 2-bromoisobutyrate and mixtures thereof. A particularly preferred initiator is diethyl-2-bromo-2-methyl malonate.

Catalysts that may be used in preparing hydroxyl functional polymers of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula X, $$TM^{n+}Q_n \quad (X)$$

wherein TM is the transition metal, n is the formal charge on the transition metal having a value of from 0 to 7, and Q is a counterion or covalently bonded component. Examples of the transition metal (TM) include, but are not limited to, Cu, Au, Ag, Hg, Pd, Pt, Co, Mn, Ru, Mo, Nb, Fe, and Zn. Examples of Q include, but are not limited to, halogen, hydroxy, oxygen, $C_1$–$C_6$-alkoxy, cyano, cyanato, thiocyanato and azido. A preferred transition metal is Cu(I) and Q is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the hydroxyl functional polymers of the present invention are described on pages 45 and 46 of international patent publication WO 97/18247. Redox conjugates are described on pages 27 through 33 of international patent publication WO 97/18247.

Ligands that may be used in preparing hydroxyl functional polymers of the present invention include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkylbipyridyls. Additional ligands that may be used in preparing epoxy functional polymers of the present invention are described on pages 46 through. 53 of international patent publication WO 97/18247.

In preparing the hydroxyl functional polymers of the present invention the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the hydroxyl functional polymer can be directly related to the relative concentrations of initiator and monomer(s), the molar ratio of initiator to monomer is an important factor in polymer preparation. The molar ratio of initiator to monomer is typically within the range of $10^{-4}:1$ to 0.5:1, for example, $10^{-3}:1$ to $5 \times 10^{-2}:1$.

In preparing the hydroxyl functional polymers of the present invention, the molar ratio of transition metal compound to initiator is typically in the range of $10^{-4}:1$ to 10:1, for example, 0.1:1 to 5:1. The molar ratio of ligand to transition metal compound is typically within the range of 0.1:1 to 100:1, for example, 0.2:1 to 10:1.

Hydroxyl functional polymers useful in the thermosetting compositions of the present invention may be prepared in the absence of solvent, i.e., by means of a bulk polymerization process. Generally, the hydroxyl functional polymer is prepared in the presence of a solvent, typically water and/or an organic solvent. Classes of useful organic solvents include, but are not limited to, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatics, particularly preferred examples of which are xylene and SOLVESSO 100, a blend of aromatic solvents available from Exxon Chemicals America. Additional solvents are described in further detail on pages 53 through 56 of international patent publication WO 97/18247.

The hydroxyl functional polymer is typically prepared at a reaction temperature within the range of 25° C. to 140° C., preferably from 50° C. to 100° C., and a pressure within the range of 1 to 100 atmospheres, typically at ambient pressure. The atom transfer radical polymerization is typically completed in less than 24 hours, e.g., between 1 and 8 hours.

Prior to use in the thermosetting compositions of the present invention, the ATRP transition metal catalyst and its associated ligand are typically separated or removed from the hydroxyl functional polymer. This, however, is not a requirement of the invention. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst may be oxidized in situ and retained in the hydroxyl functional polymer.

The hydroxyl functional polymer may be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear hydroxyl functional polymers may be prepared by using initiators having one or two radically transferable groups, e.g., diethyl-2-halo-2-methyl malonate and α,α'-dichloroxylene. Branched hydroxyl functional polymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis(methacrylate). Hyperbranched hydroxyl functional polymers may be prepared by increasing the amount of branching monomer used.

Star hydroxyl functional polymers may be prepared using initiators having three or more radically transferable groups, e.g., hexakis(bromomethyl)benzene. As is known to those of ordinary skill in the art, star polymers may be prepared by core-arm or arm-core methods. In the core-arm method, the star polymer is prepared by polymerizing monomers in the presence of the polyfunctional initiator, e.g., hexakis(bromomethyl)benzene. Polymer chains, or arms, of similar composition and architecture grow out from the initiator core, in the core-arm method.

In the arm-core method, the arms are prepared separately from the core and optionally may have different compositions, architecture, molecular weight and PDI's. The arms may have different hydroxyl equivalent weights, and some may be prepared without any hydroxyl functionality. After the preparation of the arms, they are attached to the core.

Hydroxyl functional polymers in the form of graft polymers may be prepared using a macroinitiator, as previously described herein. Graft, branched, hyperbranched and star polymers are described in further detail on pages 79 through 91 of international patent publication WO 97/18247.

The polydispersity index (PDI) of hydroxyl functional polymers useful in the present invention, is typically less than 2.5, more typically less than 2.0, and preferably less than 1.8, for example, 1.5. As used herein, and in the claims, "polydispersity index" is determined from the following equation: (the weight average molecular weight ($M_w$)/ number average molecular weight ($M_n$)). A monodisperse polymer has a PDI of 1.0.

The symbol φ as shown in structures VIII and IX is or is derived from a residue of the initiator free of the radically transferable group; it is most often a sulfonyl group or a malonate. For example, if the hydroxyl functional polymer is initiated by benzyl bromide, φ, or more specifically, φ-, is a residue of the structure:

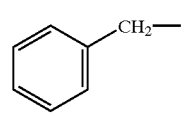

(XI)

Also, φ may derived from the residue of the initiator. For example, when the polymer is initiated using epichlorohydrin, φ,or more specifically, φ-, is the 2,3-epoxypropyl residue,

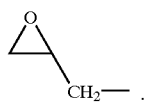

The 2,3-epoxy-propyl residue can then be converted to, for example, a 2,3-dihydroxypropyl residue. Derivations or conversions of the initiator residue are preferably performed at a point in the ATRP process when loss of hydroxyl functionality along the polymer backbone is minimal, for example, prior to incorporating a block of residues having hydroxyl functionality.

In general formulas VIII and IX, subscript z is equal to the number of hydroxyl functional polymer chains that are attached to φ. Subscript z is at least 1 and may have a wide range of values. In the case of comb or graft polymers, wherein Q is a macroinitiator having several pendant radically transferable groups, z can have a value in excess of 10, for example 50, 100 or 1000. Typically, z is less than 10, preferably less than 6 and more preferably less than 5. In a preferred embodiment of the present invention, z is 1 or 2.

Symbol T of general formulas VIII and IX is or is derived from the radically transferable group of the initiator. For example, when the hydroxyl functional polymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. In the present invention, it is desirable that the method by which the radically transferable group is either removed or chemically converted also be relatively mild with regard to the hydroxyl functionality of the polymer.

In a preferred embodiment of the present invention, the radically transferable group is a halogen and is removed by means of a mild dehalogenation reaction, which does not reduce the hydroxyl functionality of the polymer. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated hydroxyl functional polymer of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated hydroxyl functional polymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the hydroxyl functional polymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the hydroxyl functional polymer of the composition of the present invention under mild conditions include those represented by the following general formula XII.

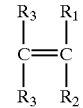

XII

In general formula XII, $R_1$ and $R_2$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_1$ and $R_2$ groups is an organo group while the other can be an organo group or hydrogen. For instance when one of $R_1$ or $R_2$ is an alkyl group, the other can be an alkyl, aryl, acyloxy, alkoxy, arenes, sulfur-containing alkyl group, or nitrogen-containing alkyl and/or nitrogen-containing aryl groups. The $R_3$ groups can be the same or different groups selected from hydrogen or lower alkyl selected such that the reaction between the terminal halogen of the hydroxyl functional polymer and the LRPEU compound is not prevented. Also an $R_3$ group can be joined to the $R_1$ and/or the $R_2$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen terminated hydroxyl functional polymer and LRPEU compound, e.g., alpha-methyl styrene, is summarized in the following general scheme 1.

General Scheme 1

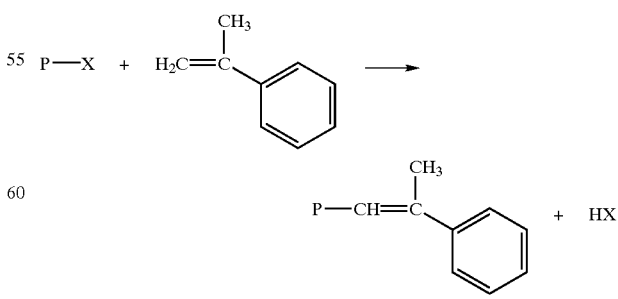

In general scheme 1, P—X represents the halogen terminated hydroxyl functional polymer.

As indicated above, the hydroxyl functional polymer may have any of a number of polymer structures, selected from linear polymers, branched polymers, hyperbranched polymers, star polymers, gradient polymers, and graft polymers. Mixtures of one or more different types of these polymers may be used in the composition of the present invention.

The hydroxyl functional polymer may be used in the thermosetting composition of the present invention as a resinous binder or as an additive in combination with a separate resinous binder, which may be prepared by atom transfer radical polymerization or conventional polymerization methods. When used as an additive, the hydroxyl functional polymer as described herein may have low functionality (it may be monofunctional) and a correspondingly high equivalent weight. Alternatively, for other applications such as use as a reactive diluent, the additive may be highly functional with a correspondingly low equivalent weight.

The hydroxyl functional polymer is typically present in the thermosetting composition of the present invention in an amount of at least 0.5 percent by weight (when used as an additive), preferably at least 10 percent by weight (when used as a resinous binder), and more preferably at least 25 percent by weight, based on the total weight of resin solids of the thermosetting composition. The thermosetting composition also typically contains hydroxyl functional polymer present in an amount of less than 99.5 percent by weight, preferably less than 90 by weight, and more preferably less than 75 percent by weight, based on the total weight of resin solids of the thermosetting composition. The hydroxyl functional polymer may be present in the thermosetting composition of the present invention in an amount ranging between any combination of these values, inclusive of the recited values.

The thermosetting composition of the present invention further comprises a crosslinking agent having at least two functional groups that are reactive with hydroxyl groups. Examples of suitable crosslinking agents include aminoplasts containing methylol and/or methylol ether groups and polyisocyanates.

Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formaldehyde condensates etherified with an alcohol containing from one to four carbon atoms.

Other suitable crosslinking agents include polyisocyanates. The polyisocyanate crosslinking agent may be a fully capped polyisocyanate with substantially no free isocyanate groups, or it may contain free isocyanate functionality. Free isocyanate groups allow for curing of the composition at temperatures as low as ambient. When the crosslinking agent contains free isocyanate groups, the film-forming composition is preferably a two-package composition (one package comprising the crosslinking agent and the other comprising the hydroxyl functional polymer) in order to maintain storage stability.

The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

The crosslinking agent is typically present in the thermosetting compositions of the present invention in an amount of at least 10 percent by weight, preferably at least 25 percent by weight, based on total resin solids weight of the composition. The crosslinking agent is also typically present in the composition in an amount of less than 90 percent by weight, preferably less than 75 percent by weight, based on total resin solids weight of the composition. The amount of crosslinking agent present in the thermosetting composition of the present invention may range between any combination of these values, inclusive of the recited values.

The equivalent ratio of hydroxyl groups in the polymer to reactive functional groups in the crosslinking agent is typically within the range of 1:0.5 to 1:1.5, preferably 1:0.8 to 1:1.2.

Usually the thermosetting composition will also preferably contain catalysts to accelerate the cure of the crosslinking agent with reactive groups on the polymer(s). Suitable catalysts for aminoplast cute include acids such as acid phosphates and sulfonic acid or a substituted sulfonic acid. Examples include dodecylbenzene sulfonic acid, paratoluene sulfonic acid, phenyl acid phosphate, ethylhexyl acid phosphate, and the like. Suitable catalysts for isocyanate cure include organotin compounds such as dibutyltin oxide, dioctyltin oxide, dibutyltin dilaurate, and the like. The catalyst is usually present in an amount of about 0.05 to 3about 5.0 percent by weight, preferably about 0.25 to about 2.0 percent by weight, based on the total weight of resin solids in the thermosetting composition.

The thermosetting composition of the present invention is preferably used as a film-forming (coating) composition, and may contain adjunct ingredients conventionally used in such compositions. Optional ingredients such as, for example, plasticizers, surfactants, thixotropic agents, antigassing agents, organic cosolvents, flow controllers, antioxidants, UV light absorbers and similar additives conventional in the art may be included in the composition. These ingredients are typically present at up to about 40% by weight based on the total weight of resin solids.

The thermosetting composition of the present invention is typically a liquid and may be waterborne, but is usually solventborne. Suitable solvent carriers include the various esters, ethers, and aromatic solvents, including mixtures thereof, that are known in the art of coating formulation. The composition typically has a total solids content of about 40 to about 80 percent by weight.

The thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

As stated above, the thermosetting compositions of the present invention may be used in a method of coating a substrate comprising applying a thermosetting composition to the substrate, coalescing the thermosetting composition over the substrate in the form of a substantially continuous film, and curing the thermosetting composition.

The compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition, but in general a drying time of from about 1 to 5 minutes at a temperature of about 68–250° F. (20–121° C.) will be adequate. More than one coat of the composition may be applied to develop the optimum appearance. Between coats the previously applied coat may be flashed; that is, exposed to ambient conditions for about 1 to 20 minutes.

The film-forming composition of the present invention is preferably used as the clear coat layer in a multi-component composite coating composition such as a "color-plus-clear" coating system, which includes at least one pigmented or colored base coat and at least one clear topcoat. In this embodiment, the clear film-forming composition may include the thermosetting composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but if needed, lower or higher temperatures may be used as necessary to activate crosslinking mechanisms.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLES A–C

Synthesis Examples A–C describe the preparation of hydroxyl-functional polymers used in coating composition Examples 1–3. The hydroxyl-functional polymer of Example A is a comparative polymer prepared by non-living radical polymerization. The hydroxyl-functional polymers of Examples B and C are representative of polymers useful in the thermosetting coating compositions of the present invention. The physical properties of the polymers of Examples A–C are summarized in Table 1.

In synthesis Examples A–C, the following monomer abbreviations are used: iso-butyl methacrylate (IBMA); and hydroxypropyl methacrylate (HPMA). Each of the polymers of Examples A–C were prepared from monomers comprising 60 percent by weight IBMA monomer and 40 percent by weight HPMA monomer, based on the total weight of monomers. The block copolymer structures shown in each of Examples B and C are representative general block copolymer formulas.

Example A

A comparative hydroxyl-functional polymer was prepared by standard, i.e., non-controlled or non-living, radical polymerization from the ingredients enumerated in Table A.

TABLE A

| Ingredients | Parts by weight |
|---|---|
| Charge 1 | |
| xylene | 500.0 |
| n-butanol | 125.0 |
| Charge 2 | |
| HPMA monomer | 240.0 |
| IBMA monomer | 360.0 |
| initiator (a) | 30.0 |

TABLE A-continued

| Ingredients | Parts by weight |
|---|---|
| Charge 3 | |
| xylene | 8.0 |
| n-butanol | 2.0 |
| initiator (a) | 6.0 |

(a) 2,2'-azobis(2-methylbutanenitrile) initiator, obtained commercially from E. I. du Pont de Nemours and Company.

Charge 1 was heated to reflux temperature at atmospheric pressure under a nitrogen blanket in a 2 liter round bottom flask equipped with a rotary blade agitator, reflux condenser, thermometer and heating mantle coupled together in a feed-back loop through a temperature controller, nitrogen inlet port, and two addition ports. While under conditions of reflux, Charge 2 was fed into the flask over a period of 3 hours. At the completion of the addition of Charge 2, the contents of the flask were held at reflux for an additional hour. The contents of the flask were then cooled to 100° C. and Charge 3 was added over a period of 10 minutes, followed by a 2 hour hold at 100° C. The contents of the flask were cooled and transferred to a suitable container.

Example B

A hydroxyl-functional triblock copolymer useful in the thermosetting compositions of the present invention was prepared by atom transfer radical polymerization from the ingredients listed in Table B. The hydroxyl-functional block copolymer of this example is summarized diagrammatically as follows:

(HPMA, IBMA)-(IBMA)-(HPMA)

TABLE B

| Ingredients | Parts by weight |
|---|---|
| Charge 1 | |
| toluene | 500.0 |
| copper(II) bromide (b) | 11.2 |
| copper powder (c) | 32.0 |
| 2,2'-bypyridyl | 78.0 |
| Charge 2 | |
| diethyl-2-bromo-2-methylmalonate | 125.0 |
| Charge 3 | |
| HPMA monomer | 146.0 |
| IBMA monomer | 144.0 |
| Charge 4 | |
| toluene | 500.0 |
| IBMA monomer | 720.0 |
| Charge 5 | |
| HPMA monomer | 420.0 |

(b) The copper(II) bromide was in the form of flakes and was obtained from Aldrich Chemical Company.
(c) The copper powder had an average particle size of 25 microns, a density of 1 gram/cm$^3$, and was obtained commercially from OMG Americas.

Charge 1 was heated to and held at 50° C. for one hour in a 2 liter 4-necked flask equipped with a motor driven stainless steel stir blade, water cooled condenser, and a heating mantle and thermometer connected through a temperature feed-back control device. The contents of the flask were cooled to 25° C. and Charge 2 was added over a period of 10 minutes. Charge 3 was then added over a period of 15 minutes, followed by heating the contents of the flask to and holding at 70° C. for 2 hours. At the completion of the 2 hour hold, the contents of the flask were heated to 80° C., Charge 4 was then added over 15 minutes, followed by a 2 hour hold at 80° C. The contents of the flask were next cooled to a temperature of 70° C., and Charge 5 was added over 15 minutes, followed by a 3 hour hold at 70° C. With the completion of the 3 hour hold, 200 grams of xylene and 100 grams of MAGNESOL synthetic magnesium silicate obtained commercially from The Dallas Group of America were added to the flask followed by mixing for 30 minutes at 70° C. The contents of the flask were filtered, and the filtered resin was vacuum stripped to a total solids of 70 percent by weight, based on total weight.

Example C

A hydroxyl-functional triblock copolymer useful in the thermosetting compositions of the present invention was prepared by atom transfer radical polymerization from the ingredients listed in Table C. The hydroxyl-functional block copolymer of this example is summarized diagrammatically as follows:

(IBMA)-(HPMA)-(IBMA)

TABLE C

| Ingredients | Parts by weight |
|---|---|
| Charge 1 | |
| toluene | 500.0 |
| copper(II) bromide (b) | 11.2 |
| copper powder (c) | 21.5 |
| 2,2'-bypyridyl | 50.0 |
| Charge 2 | |
| diethyl-2-bromo-2-methylmalonate | 85.0 |
| Charge 3 | |
| IBMA monomer | 200.0 |
| Charge 4 | |
| HPMA monomer | 190.0 |
| Charge 5 | |
| IBMA monomer | 90.0 |

Charge 1 was heated to and held at 70° C. for one hour in a 2 liter 4-necked flask equipped as described in Example B. The contents of the flask were cooled to 25° C. and Charge 2 was added over a period of 10 minutes, followed by the addition of Charge 3 over 15 minutes. Upon the completion of the addition of Charge 3, the contents of the flask were heated to and held at 80° C. for 2 hours. At the completion of the 2 hour hold, the contents of the flask were cooled to 70° C. and Charge 4 was added over 15 minutes followed by a 2 hour hold at 70° C. The contents of the flask were next heated to 80° C. and Charge 5 was added over 15 minutes, followed by a 2 hour hold at 80° C. With the completion of the 2 hour hold, 200 grams of xylene and 100 grams of MAGNESOL synthetic magnesium silicate obtained commercially from The Dallas Group of America were added to the flask followed by mixing for 30 minutes at 70° C. The contents of the flask were filtered, and the filtered resin was vacuum stripped to a total solids of 70 percent by weight, based on total weight.

TABLE 1

Physical Data of the Polymers of Synthesis Examples A–C

| | Example A | Example B | Example C |
|---|---|---|---|
| Mn (d) | 2341 | 1188 | 1859 |
| Mw | 5618 | 1580 | 2510 |
| Mw/Mn | 2.40 | 1.33 | 1.35 |
| Percent Weight Solids (e) | 49 | 70 | 70 |

(d) Number average molecular weight (Mn) and weight average molecular weight (Mw) were determined by gel permeation chromatography (GPC) using polystyrene standards.
(e) Percent weight solids, based on total weight was determined from 0.2 gram samples at 110° C./1 hour.

Coating Composition Examples 1–3

Examples 2 and 3 are representative of thermosetting coating compositions according to the present invention, while the coating composition of Example 1 is a comparative example. The coating compositions were prepared from the ingredients enumerated in Table 2.

TABLE 2

Coating Compositions

| | Example 1 | Example 2 | Example 3 |
|---|---|---|---|
| Polymer of Example A | 124.2 | 0.0 | 0.0 |
| Polymer of Example B | 0.0 | 73.6 | 0.0 |
| Polymer of Example C | 0.0 | 0.0 | 105.4 |
| Melamine Crosslinker (f) | 35.0 | 35.0 | 35.0 |
| Flow additive (g) | 0.5 | 0.5 | 0.5 |
| DDBSA (h) | 1.0 | 1.0 | 1.0 |
| UV Stabilizer (i) | 3.0 | 3.0 | 3.0 |
| xylene | 5.0 | 5.0 | 5.0 |
| ethyl 3-ethoxypropionate | 23.3 | 48.8 | 24.4 |

(f) CYMEL 1130 melamine crosslinker obtained commercially from Cytec Industries.
(g) poly(butyl acrylate) flow additive at 60 percent weight solids in xylene, based on total weight, having a Mn = 6700, and a Mw = 2600.
(h) dodecylbenzenesulfonic acid.
(i) TINUVIN 328 ultraviolet light stabilizer available commercially from Ciba-Geigy Corp., which describes it as 2-[2'-Hydroxy-3',5'-Di-tertamylphenyl]-2-H-benzotriazole.

The ingredients of coating composition Examples 1–3 were each mixed thoroughly in a suitable container. Physical properties of the liquid coating compositions were measured and the results are summarized in Table 3. Test panels were first coated with a white basecoat (DCT-6640 white basecoat, available commercially from PPG Industries, Inc.), which was dried at 93° C. for 5 minutes. The liquid coating compositions of Examples 1–3 were spray applied over the white basecoated test panels, and cured at 141° C. for 30 minutes. Physical properties of the cured coatings were determined, and the results are summarized in Table 4.

TABLE 3

Physical Properties of Coating Compositions 1–3

| | Example 1 | Example 2 | Example 3 |
|---|---|---|---|
| % Weight Solids (j) | 48.4 | 56.3 | 52.0 |
| Viscosity (seconds) (k) | 23 | 23 | 23 |

(j) Percent weight solids of the coating compositions was measured at 110° C. for 60 minutes.
(k) Viscosity was determined by measuring the amount of time it took for the liquid coating composition to drain out of a filled Number 4 Ford Cup, available commercially from Gardner Lab.

TABLE 4

Physical Properties of Cured Coatings Obtained From Coating Compositions 1–3.

| | Example 1 | Example 2 | Example 3 |
|---|---|---|---|
| Cured film thickness (microns) | 48 | 38 | 41 |
| 20° Gloss (l) | 86 | 88 | 86 |
| Distinctness of image (m) | 82 | 94 | 80 |
| Knoop hardness (n) | 12.5 | 10.4 | 13.9 |
| % Gloss retained after mar testing (o) | 87 | 88 | 89 |
| Pencil hardness (p) | 2H | H | 2H |
| Pencil hardness after spot soaking with xylene (q) | 2H | H | 2H |

(l) 20° gloss values were obtained using a BYK Gardner Haze-Gloss Meter in accordance with the manufacturer's suggested method of operation.

(m) Distinctness of image (DOI) values of the cured coatings were obtained using a DORIGON II DOI meter in accordance with the manufacture's suggested method of operation. DOI values of greater magnitude are indicative of smoother coatings.

(n) Knoop hardness of the cured coatings was measured in accordance with American Standard Test Method (ASTM) D 1474-92 using a Tukon Microhardness Tester Model 300 (from Wilson Instruments, Division of Instron Corporation). The microhardness tester was operated with a 25 gram weight on the indentor. Knoop hardness values of greater magnitude are indicative of harder coatings. Knoop hardness values of 10 or greater are generally considered to be desirable.

(o) Percent gloss retention was determined by comparing 20° gloss measurements (using a BYK Gardner Haze-Gloss Meter) taken before and after mar testing of the cured coatings. Coated test panels were lightly dusted with BON-AMI abrasive cleanser (from Bon-Ami Company), the dusted test panels were then run through 30 cycles on an Atlas AATCC Mar Tester Model CM-5(From Atlas Electrical Devices Co.). The mar tester was operated with a felt cloth cover on the cylindrical acrylic finger of the mar tester. A new felt cloth covering was used for every 10 cycles of mar tester operation. At the completion of 30 cycles of mar testing, the test panels were rinsed with cold tap water, dried, 20° gloss readings were taken, and the percent gloss retained was calculated using the following equation: (Marred 20° gloss reading/original 20° gloss reading)×100.

(p) The pencil hardness of a cured film is determined manually by attempting to scratch the film surface with a series of pencils, going from pencils having soft lead to those having harder lead. From softest to hardest, the pencil hardness series is as follows: 4B, 3B, 2B, B, F, HB, H, 2H, 3H, 4H, 5H. The pencil hardness listed in Table 4 is that of the hardest pencil which did not scratch the solvent treated film surface.

(q) A drop of xylene having a diameter of about 1 to 1.5 cm was placed on the surface of the cured film for 3 minutes. The drop of xylene was wiped off of the film, and the pencil hardness of the film where the drop had been was determined, as described previously herein.

The results as summarized in Table 4 show that thermosetting coating compositions according to the present invention, i.e., Examples 2 and 3, provide cured coatings having properties similar to those of cured coatings obtained from comparative compositions, i.e., Example 1. In addition, the results as summarized in Table 3 show that liquid coating compositions according to the present invention, i.e., Examples 2 and 3, have higher percent weight solids at the same viscosity than comparative liquid coating compositions, i.e., Example 1.

The present invention has been described with reference to specific details of particular embodiments thereof. It is not intended that such details be regarded as limitations upon the scope of the invention except insofar as and to the extent that they are included in the accompanying claims.

We claim:
1. A method of coating a substrate comprising:
(a) applying a liquid thermosetting composition to the substrate;
(b) coalescing the thermosetting composition over the substrate in the form of a substantially continuous film; and
(c) curing the thermosetting composition, wherein the liquid thermosetting composition comprises:
(i) a crosslinking agent having at least two functional groups that are reactive with hydroxyl groups; and
(ii) a non-geled, hydroxyl functional nonrandom copolymer prepared by atom transfer radical polymerization, in the presence of an initiator having at least one radically transferable group, and wherein the polymer contains at least one of the following polymer chain structures:

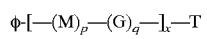

and

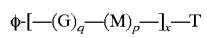

wherein M is a residue, that is free of hydroxyl functionality, of at least one ethylenically unsaturated radically polymerizable monomer; G is a residue, that has hydroxyl functionality, of at least one ethylenically unsaturated radically polymerizable monomer; φ is a residue from the initiator, free from the radically transferable group, selected from the group consisting of sulfonyl compounds, diethyl malonates and mixtures thereof; T is or is derived from the radically transferable group and is selected from the group consisting of halides and a dehalogenation reaction product of a limited radically polymerizable ethylenically unsaturated compound; p and q represent average numbers of residues occurring in a block of residues in each polymer chain structure; x represents the number of radically transferable groups and p, q and x are each independently at least 1 and are selected for each structure such that said hydroxyl functional polymer has a number average molecular weight of at least 250 to 16,000.

2. The method of claim 1 wherein the hydroxyl functional polymer has a number average molecular weight of from 500 to 10,000, and a polydispersity index of less than 2.0.

3. The method of claim 1 wherein said initiator is selected from the group consisting of methanesulfonyl halides, p-toluenesulfonyl halides, and diethyl malonates.

4. The method of claim 1 wherein the polymer has a hydroxyl equivalent weight of from 116 to 10,000 grams/equivalent.

5. The method of claim 1 wherein p and q are each independently within the range of 0 to 100 for each x segment and for each structure, and wherein the sum of p and q is greater than zero for each x segment and q is greater than zero for at least one x segment.

6. The method of claim 1 wherein x for each structure is independently in the range of at least 1 to 100.

7. The method of claim 1 wherein M is derived from at least one of vinyl monomers, (meth)allylic monomers, and olefins.

8. The method of claim 1 wherein M is derived from at least one of alkyl (meth)acrylates having 1 to 20 carbon atoms in the alkyl group, unsaturated aromatic monomers and olefins.

9. The method of claim 1 wherein the hydroxyl functional polymer contains at least one of the following polymer chain structures:

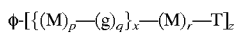

or

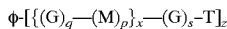

wherein M is a residue, that is free of hydroxyl functionality, of at least one ethylenically unsaturated radically polymerizable monomer; G is a residue, that has hydroxyl functionality, of at least one ethylenically, unsaturated radically polymerizable monomer; φ is a residue from the initiator, free from the radically transferable group, selected from the group consisting of sulfonyl compounds, diethyl 2-halo-2-methylmalonates and mixtures thereof; T is or is derived from the radically transferable group and is selected from the group consisting of halides and a dehalogenation reaction product of a limited radically polymerizable ethylenically unsaturated compound; p and q represent average numbers of residues occurring in a block of residues in each polymer chin structure; x represents the number of radically transferable groups, r and a are each independently in the range of 1 to 100; is in the range of at least 1 to 100; p and q are each independently within the values of 1 to 100 for each x segment; z is at least 1, and the hydroxyl functional polymer has a number average molecular weight of at least 250 to 16,000 and a polydispersity index of less than 2.0.

10. The method of claim 9 wherein the hydroxyl functional polymer has a number average molecular weight of from 500 to 10,000, and a polydispersity index of less than 1.8.

11. The method of claim 9 wherein T is a halide.

12. The method of claim 9 wherein T is derived from a dehalogenation post-reaction.

13. The method of claim 12 wherein said dehalogenation post-reaction comprises contacting said hydroxyl functional polymer with a limited radically polymerizable ethylenically unsaturated compound.

14. The method of claim 13 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

15. The method of claim 1 wherein said crosslinking agent is selected from polyisocyanates, blocked polyisocyanates and aminoplasts containing methylol and/or methylol ether groups.

16. The method of claim 1 wherein said hydroxyl functional polymer has a polydispersity index of less than 1.50.

17. The method of claim 1 wherein the equivalent ratio of hydroxyl groups in (ii) to reactive functional groups in (i) is within the range of 1:0.5 to 1:1.5.

18. The method of claim 1 wherein (i) is present in the thermosetting composition in amounts of 10 to 90 percent by weight and (ii) is present in the thermosetting composition in amounts of 10 to 90 percent by weight, based on the total weight of resin solids in the thermosetting composition.

19. The method of claim 1 wherein G is derived from at least one ethylenically unsaturated radically polymerizable monomer selected from hydroxyalkyl acrylates and hydroxyalkyl methacrylates which have from 2 to 4 carbon atoms in the hydroxyalkyl group.

20. The method of claim 1 wherein the thermosetting composition is applied as a clear coat over a colored base coat to form a color-plus-clear composite coating.

21. A substrate coated by the method of claim 1.

22. A multi-component composite coating composition comprising a base coat deposited from a pigmented film-forming composition and a transparent top coat applied over the base coat wherein the transparent top coat is deposited from a clear film-forming composition and is a liquid thermosetting composition comprising:

(a) a crosslinking agent having at least two functional groups that are reactive with hydroxyl groups; and (b) a non-gelled, hydroxyl functional nonrandom copolymer prepared by atom transfer radical polymerization, in the presence of an initiator having at least one radically transferable group, and wherein the polymer contains at least one of the following polymer chain structures:

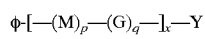

and

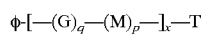

wherein M is a residue that is free of hydroxyl functionality, of at least one ethylenically unsaturated radically polymerizable monomer; G is a residue, that has hydroxyl functionality, of at least one ethylenically unsaturated radically polymerizable monomer; φ is a residue from the initiator, free from the radically transferable group, selected from the group consisting of sulfonyl compounds, diethyl malonates and mixtures thereof; T is or is derived from the radically transferable group and is selected from the group consisting of halides and a dehalogenation reaction product of a limited radically polymerizable ethylenically unsaturated compound; p and q represent average numbers of residues occurring in a block of residues in each polymer chain structure; x represents the number of radically transferable groups; and p, q and x are each independently at least 1 and are selected for each structure such that said hydroxyl functional polymer has a number average molecular weight of at least 250 to 16,000.

23. The multi-component composite coating composition of claim 22 wherein the hydroxyl functional polymer has a number average molecular weight of from 500 to 10,000, and a polydispersity index of less than 2.0.

24. The multi-component composite coating composition of claim 22 wherein said initiator is selected from the group consisting of methanesulfonyl halides, p-toulenesulfonyl halides, and diethyl malonates.

25. The multi-component composite coating composition of claim 22, wherein the polymer has a hydroxyl equivalent weigh, of from 116 to 10,000 grams/equivalent.

26. The multi-component composite coating composition of claim 22, wherein p and q are each independently within the range of 0 to 100 for each x segment and for each structure, and wherein the sum of p and q is greater than zero for each x segment and q is greater than zero for at least one x segment.

27. The multi-component composite coating composition of claim 22, wherein x for each structure is independently in the range of at least 1 to 100.

28. The multi-component composite coating composition of claim 22 wherein M is derived from at least one of vinyl monomers, (meth)allylic monomers, and olefins.

29. The multi-component composite coating composition of claim 22 wherein M is derived from at least one of alkyl (meth)acrylates having 1 to 20 carbon atoms in the alkyl group, unsaturated aromatic monomers and olefins.

30. The multi-component composite coating composition of claim 22 wherein the hydroxyl functional polymer contains at least one of the following polymer chain structures:

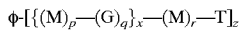

or

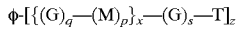

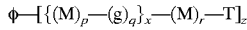

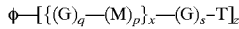

wherein M is a residue, that is free of hydroxyl functionality, of at least one ethylenically unsaturated radically polymerizable monomer; G is a residue, that has hydroxyl functionality, of at least one ethylenically, unsaturated radically polymerizable monomer; φ is a residue from the initiator, free from the radically transferable group, selected from the group consisting of sulfonyl compounds, diethyl 2-halo-2-methylmalonates and mixtures thereof; T is or is derived from the radically transferable group and is selected from the group consisting of halides and a dehalogenation reaction product of a limited radically polymerizable ethylenically unsaturated compound; p and q represent average numbers of residues occurring in a block of residues in each polymer chin structure; x represents the number of radically transferable groups, r and a are each independently in the range of 1 to 100; is in the range of at least 1 to 100; p and q are each independently within the values of 1 to 100 for each x segment; z is at least 1, and the hydroxyl functional polymer has a number average molecular weight of at least 250 to 16,000 and a polydispersity index of less than 2.0.

31. The multi-component composite coating composition of claim 30 wherein the hydroxyl functional polymer has a number average molecular weight of from. 500 to 10,000, and a polydispersity index of less than 1.8.

32. The multi-component composite coating composition of claim 30 wherein T is a halide.

33. The multi-component composite coating composition of claim 30 wherein T is derived from a dehalogenation post-reaction.

34. The multi-component composite coating composition of claim 33 wherein said dehalogenation post-reaction comprises contacting said hydroxyl functional polymer with a limited radically polymerizable ethylenically unsaturated compound.

35. The multi-component composite coating composition of claim 34 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

36. The multi-component composite coating composition of claim 22 wherein said crosslinking agent is selected from polyisocyanates, blocking polyisocyanates and aminoplasts containing methylol and/or methylol ether groups.

37. The multi-component composite coating composition of claim 22 wherein said hydroxyl functional polymer has a polydispersity index of less than 1.50.

38. The multi-component composite coating composition of claim 22 wherein the equivalent ratio of hydroxyl groups in (b) to reactive functional groups in (a) is within the range of 1:0.5 to 1:1.5.

39. The multi-component composite coating composition of claim 22 wherein (a) is present in the clear film-forming composition amounts of 10 to 90 percent by weight and (b) is present in the clear film-forming composition amounts of 10 to 90 percent by weight, based on the total weight of resin solids in the clear film-forming composition.

40. The multi-component composite coating composition of claim 22 wherein (a) is derived from at least one ethylenically unsaturated radically polymerizable monomer selected from hydroxyalkyl acrylates and hydroxyalkyl methacrylates which have from 2 to 4 carbon atoms in the hydroxyalkyl group.

41. A substrate having the multi-component composite coating composition of claim 22 deposited thereon.

42. A substrate having the multi-component composite coating composition of claim 30 deposited thereon.

* * * * *

UNITED STATES PATENT AND TRADEMARK OFFICE
CERTIFICATE OF CORRECTION

PATENT NO. : 6,517,905 B2
DATED : February 11, 2003
INVENTOR(S) : Daniela White et al.

It is certified that error appears in the above-identified patent and that said Letters Patent is hereby corrected as shown below:

Column 22,
Line 38, "non-geled" should read -- non-gelled --.
Line 66, insert a semi-colon (;) after "groups".

Column 23,
Line 30, "(g)" should read -- (G) --.
Line 39, delete the comma after "ethylenically".
Line 50, "chin" should read -- chain --.
Line 53, insert -- x -- before "is".

Column 25,
Line 15, "weigh" should read -- weight --.
Lines 41-43, delete the two formulas.
Line 48, delete the comma after "ethylenically".

Column 26,
Line 1, "chin" should read -- chain --.
Line 4, insert -- x -- before "is".
Line 32, "blocking" should read -- blocked --.
Line 48, "(a)" should read -- (G) --.

Signed and Sealed this

Twenty-first Day of June, 2005

JON W. DUDAS
*Director of the United States Patent and Trademark Office*